United States Patent

[11] 3,599,117

[72] Inventor Colin S. Willett
 Washington, D.C.
[21] Appl. No. 38,160
[22] Filed May 18, 1970
[45] Patented Aug. 10, 1971
[73] Assignee The United States of America as represented by the Secretary of the Army

[54] METHOD AND APPARATUS FOR TRACKING AN INVISIBLE GAS LASER BEAM
 19 Claims, 2 Drawing Figs.
[52] U.S. Cl. ................................................. 331/94.5, 250/199
[51] Int. Cl. ...................................................... H01s 3/22
[50] Field of Search .......................................... 331/94.5; 250/199

[56] References Cited
OTHER REFERENCES

Rigden et al., " Simultaneous Gas Moser Action..." Proc. IRE. Nov. 1962, pp. 2366— 7. TF5700 I7

White et al., " The Effect of Superradiance ... in the He-Ne Maser," Applied Physics Letters, vol. 2, No. 11, 1 June 1963, pp. 211— 12. QC 1 A745

Cheo et al., " Gain Characteristics....at 10.6 Microns," IEEE J. Quontum Elect. vol. QB-3, No. 2, Feb. 1967, pp. 79— 84 (note FIG. 9) QC 447 I2

Primary Examiner—Ronald L. Wibert
Assistant Examiner—R. J. Webster
Attorneys—Harry M. Saragovitz, Edward J. Kelly, Herbert Berl and J. D. Edgerton ABSTRACT: Method and apparatus for tracking an invisible gas laser beam. A superradiant transient-type laser material is added to a gas laser such as the $CO_2$-far infrared laser and the combination is excited by extremely fast rise-time excitation pulses that induce laser emission in both the $CO_2$ and the superradiant additive to produce a dual simultaneous emission. If the superradiant material is one whose stimulated emission falls within the visible spectrum, it will provide a visible tracer for the invisible 10.6 micron $CO_2$-laser beam. The superradiant additive can also be chosen so that its wavelength falls just outside the visible spectrum where good detectors or image intensifiers are available, thus improving greatly the detection means normally available for the $CO_2$-laser beam alone. A compound mirror can be utilized at one end of the gas laser cavity for enhancing the oscillations of both lasing materials.

PATENTED AUG 10 1971

3,599,117

INVENTOR,
COLIN S. WILLETT
BY Harry M. Saragovitz
Edward J. Kelly
Herbert Berl
J. D. Edgerton
ATTORNEYS

METHOD AND APPARATUS FOR TRACKING AN INVISIBLE GAS LASER BEAM

BACKGROUND OF THE INVENTION

1. Field of the Invention

This invention relates to lasers, and more particularly to gas lasers of the carbon dioxide far infrared type that can be operated with fast excitation pulses and at atmospheric pressures.

2. Description of the Prior Art

COnsiderable work has been done recently in the development of techniques for operating carbon dioxide lasers at atmospheric pressure instead of the near vacuum required of existing gas lasers. See, for example, *Laser Breakthrough*, Canadian Electronics Engineering, pp. 27—29, Feb. 1970, and U.S. Pat. No. 3,341,309 to A. E. Hill. These new $CO_2$-lasers are excited by extremely fast rise-time excitation pulses and produce high energy, high repetition rate invisible laser beams at a wavelength of about 10.6 microns. The fact that the infrared laser beams thus produced are invisible to the naked eye poses some problems. Using such a system, one does not know where the beams are or where exactly they are being focused. This presents a considerable safety hazard likely to occur in many possible uses of the laser. Additionally, elaborate cooled detectors are needed to detect the invisible $CO_2$-beams, whereas cheaper and less complex detectors such as photomultipliers are employed to detect smaller wavelength visible beams not normally available from $CO_2$-gas lasers. It follows that it would be extremely advantageous to have some means by which to trace or detect visible $CO_2$-laser beams.

Accordingly, the primary object of the present invention is to provide a method and apparatus for tracking an invisible gas laser beam.

Another object is to provide a gas laser in which two materials are excited to produce two simultaneous emissions using the same excitation system.

A further object is to provide a simultaneous secondary laser discharge within a carbon dioxide laser that is easily detectable and thus allows the use of more reliable detection means over the far infrared detectors currently in use.

A still further object is to provide a visible laser marker for an invisible gas laser beam.

SUMMARY OF THE INVENTION

Briefly, in accordance with the invention, a tracer is provided for an invisible laser beam emitted from a gas laser. A superradiant laser material is added to the gas laser to produce a high repetition rate tracer laser beam simultaneously with the far infrared gas laser beam. A common excitation system is used to excite both materials into laser emission and may for example comprise either a crossed field electrical configuration pulsed system or high voltage pulses superimposed upon a continuous voltage wave. The simultaneously emitted tracer beam may either be visible or invisible according to the stimulated emission wavelength of the added superradiant material. A special compound mirror structure may be provided at one end of the laser cavity to enhance the oscillations therein.

BRIEF DESCRIPTION OF THE DRAWINGS

The specific nature of the invention as well as other objects, aspects, uses, and advantages thereof will clearly appear from the following description and from the accompanying drawings, in which.

DESCRIPTION OF THE PREFERRED EMBODIMENTS

Figure 1:
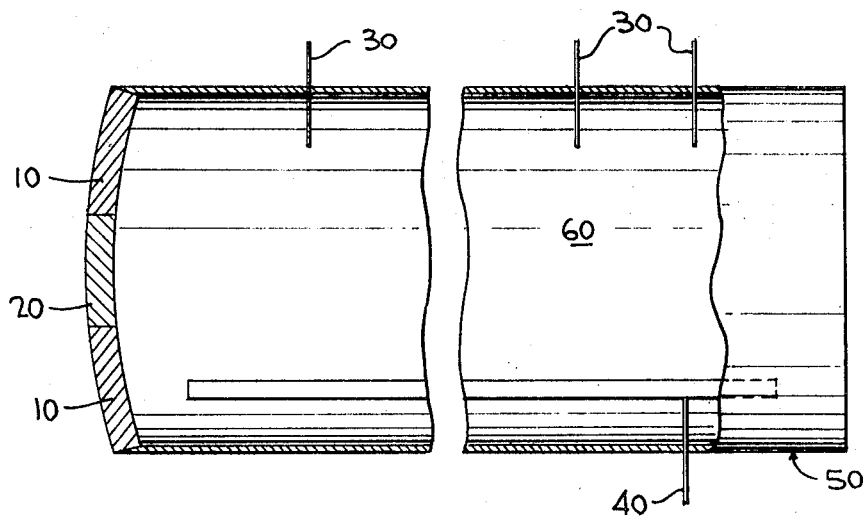
FIG. 1 is a sectional side view of one embodiment of a gas laser in accordance with the present invention.

There exists in the art a class of lasers known as transient lasers that have gains high enough to allow operation in a superradiant mode. This means that, while the output is still coherent, since the gain is so high, only one cavity mirror or no mirrors are required to produce the laser emission. See in the literature, for example, *The 5401-A. Pulsed Neon Laser*, D. A. Leonard IEEE Journal of Quantum Electronics, pp. 133—135, March 1967, and *Observation of a Superradiant Self-terminating Green Laser Transition in Neon*, Leonard Neal & Gerry, Appl. Physics Letters, Vol. 7, No. 6, p. 175, Sept. 15, 1965. These lasers are characterized by a long-lived lower laser level and an upper laser level that is highly preferentially excited and is connected to the ground state by a strong ultraviolet or a resonance transition. Typical of materials that oscillate superradiantly are helium, neon, argon, krypton, xenon, lead, copper, calcium, thallium, strontium, manganese, and nitrogen. these self-terminating lasers require short excitation pulses having rise times on the order of a few to tens of nanoseconds, identical to the type of excitation utilized with the aforedescribed high-pressure carbon dioxide lasers.

THe present invention comprises a combination of a transient-type laser material within the aforedescribed pulsed $CO_2$-laser to provide simultaneous laser emission at 10.6 microns and at the transient material frequency. IF the superradiant material were chosen to be one that emits radiation within the visible spectrum as, for example, neon, the combination would provide a visible tracer at a wavelength of 5401-A., emitted at the same time and place as the invisible $CO_2$-beam, thereby solving the problem of following and detecting the far infrared beam. Alternatively, in certain military applications, it would be advantageous to add a material to the $CO_2$-laser whose stimulated emission wavelength lies just beyond the visible region of the spectrum where it could not be seen by friend or foe alike, yet which is in the region of the spectrum where good detectors or image intensifiers are available. For a pulsed $CO_2$, 10.6-micron laser, such a marker wavelength could be provided at 8104-A. by using krypton as an additive gas. Using the same idea, it is possible to combine a beam at a wavelength of 2.026 microns, where there exists an atmospheric window, inside a high-power $CO_2$-laser system to provide a radar facility. Helium is a good choice here since it is an additive to high power $CO_2$-lasers and it works superradiantly. The same applies to obtaining transient laser emission in nitrogen in the ultraviolet region of the spectrum at a wavelength of 3371-A. simultaneously with the 10.6 micron $CO_2$-laser emission. Nitrogen is a gas used in a "normal" $CO_2$-laser. Since its presence is not essential in the aforedescribed Canadian pulsed system to give oscillation at 10.6 microns, the nitrogen content can be optimized for the marker transition with minimum concern for the 10.6-micron emission.

The choice of a gas laser need not necessarily be confined to the pulsed $CO_2$-system referred to above, but conceivably a number of gas lasers could be impregnated with a transient-type laser material to produce dual simultaneous laser emission using the same excitation system. Criteria for the selection of a suitable combination are principally that the added transient material should not unduly affect laser transition intensity in the principal medium, and that the two materials should be chosen such that there exists a large enough energy mismatch between the two upper laser levels so that any energy transfer between the two materials' upper laser levels will be minimized. The specification of the aforedescribed Canadian $CO_2$-laser as being ideally suited as a gas laser for the present invention relies on the unique fact that the $CO_2$-laser is excitable by a crossed field electrical configuration that can also be used to excite a transient-type laser. Advantages apparent as a result of using the above combination are higher peak power, high repetition rate, operation at a higher gas pressure, and smaller laser size with the output in a clean fundamental mode that is presently unobtainable with conventional transient lasers. Another possible type of excitation for the system is to superimpose high voltage pulses on top of an established CW excitation. In this way, the secondary transient material would be excited in a pulsed mode while the CW excites the primary gas laser in the usual manner. This would provide, in the case of a visible tracer, a continuous wave invisible beam with a pulsed visible tracer.

Figure 2:
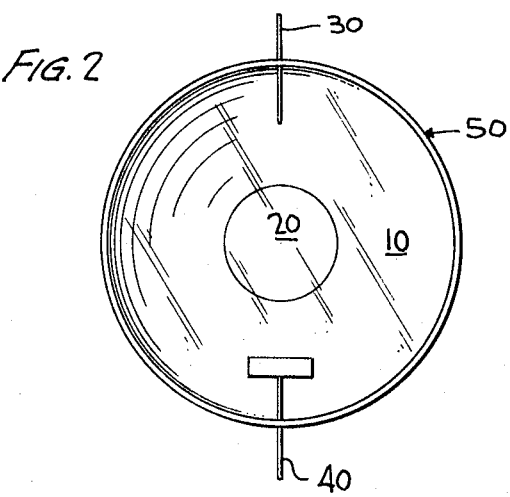
FIG. 2 is a cross-sectional view of the structure shown in FIG. 1.

Referring now to FIG. 1, laser 50 is shown containing in the cavity 60 the combination of the gaseous long-wavelength laser medium in combination with the superradiant laser material in accordance with the present invention. In FIG. 1, pin electrodes 30 and 40 are illustrative of the type used in transversely excited $CO_2$ lasers described above. A compound mirror is located at one end of cavity 60 for enhancing the emission of the lasting materials therein. The mirror is composed of an outer section 10 for reflecting the long-wavelength laser emission, and an inner section 20 used to reflect the shorter wavelength superradiant laser material emission. FIG. 2 shows a cross-sectional view of a typical arrangement of the compound mirror of FIG. 1 in which inner section 20 and outer section 10 are circular and concentric about the longitudinal axis of cavity 60. Sections 10 and 20 do not necessarily need to be similarly shaped nor to have the same radius of curvature since their operations are independent of one another. Inner section 20 could also be used for reflecting the long wavelength laser emission, provided its size is such that the lowest order mode of the long-wavelength laser line can be supported. Note that mirror 20 in FIG. 2 is situated in the position normally used for a hole for coupling power out of a long-wavelength laser using diffraction coupling.

I wish it to be understood that I do not desire to be limited to the exact details shown and described, for obvious modifications will occur to a person skilled in the art.

I claim as my invention:

1. A gas laser apparatus for emitting a plurality of laser beams of different wavelength, one of which is used as a tracer for another of said beams comprising:
   a. means for containing a gas laser medium, at least part of said means allowing the exit of said laser beams;
   b. a first gas laser medium within said containing means;
   c. a second laser medium within said containing means which is capable of superradiant laser emission when properly excited and whose upper laser level energy is sufficiently different from that of said first medium so that energy transfer between both media at these levels will be at a minimum so as not to unduly affect laser transition intensity in the first medium; and
   d. excitation means coupled to said laser media to produce stimulated emission of radiation from both of said laser medium and at least from said second medium in a superradiant mode.

2. The invention according to claim 1 wherein said second laser medium is selected from the group consisting of neon, argon, copper, thallium and manganese, whereby said tracer laser beam is visible.

3. The invention according to claim 1 wherein said second laser medium is selected from the group consisting of helium, krypton, argon, xenon, lead, calcium, strontium, manganese and nitrogen, whereby said tracer laser beam is invisible.

4. The invention according to claim 2 wherein said gas laser apparatus comprises transversely excited atmospheric pressure molecular gas laser.

5. The invention according to claim 3 wherein said gas laser apparatus comprises a transversely excited atmospheric pressure molecular gas laser.

6. The invention according to claim 4 wherein said excitation means comprises a crossed field electrical configuration that emits pulses having rise times on the order of a few nanoseconds.

7. The invention according to claim 5 wherein said excitation means comprises a crossed field electrical configuration that emits pulses having rise times on the order of a few nanoseconds.

8. The invention according to claim 2 wherein said excitation means comprises high voltage pulses superimposed on a continuous voltage wave wherein said continuous voltage wave excites said first gas laser medium and said superimposed high voltage pulses excites said second laser medium.

9. The invention according to claim 3 wherein said excitation means comprises high voltage pulses superimposed on a continuous voltage wave wherein said continuous voltage wave excites first gas laser medium and said superimposed high voltage pulses excites said second laser medium.

10. The invention according to claim 4 wherein said molecular gas is selected from the group consisting of carbon dioxide, carbon monoxide and nitrous oxide.

11. The invention according to claim 5 wherein said molecular gas is selected from the group consisting of carbon dioxide, carbon monoxide and nitrous oxide.

12. The invention according to claim 1 further comprising a compound mirror located at one end of said containing means for reflecting both the long-wavelength first medium laser beam and the short-wavelength superradiant laser beam.

13. The invention according to claim 12 wherein said compound mirror comprises an outer section that reflects only the long-wavelength first medium laser beam and an inner section located within said outer section that reflects only the short wavelength superradiant laser beam.

14. The invention according to claim 13 wherein said outer and inner sections are circular in shape and concentric about the longitudinal axis of said containing means.

15. In a gas laser apparatus, the method of tracking one of a plurality of laser beams emitted from said apparatus by utilizing another of said laser beams as a tracer comprising the steps of:
   a. providing means for contianing a gas laser medium that allows the exit of said laser beams:
   b. providing a first gas laser medium within said containing means;
   c. adding to said containing means a second laser medium which is capable of superradiant laser emission when properly excited and whose upper laser level energy is sufficiently different from that of said first medium so that energy transfer between both media at these levels will be at a minimum so as not to unduly affect laser transition intensity in the first medium; and
   d. exciting said laser media to produce stimulated emission of radiation from both of said laser media and at least from said second medium in a superradiant mode.

16. The invention according to claim 15 wherein said second laser medium is selected from the group consisting of neon, argon, copper, thallium and manganese, whereby said tracer laser beam is rendered visible.

17. The invention according to claim 15 wherein said second laser medium is selected from the group consisting of helium, krypton, argon, xenon, lead, calcium, strontium, manganese and nitrogen, whereby said tracer laser beam is rendered invisible.

18. The invention according to claim 16 wherein the means for exciting said laser media comprises a crossed field electrical configuration that emits pulses having rise times on the order of a few nanoseconds.

19. The invention according to claim 17 wherein the means for exciting said laser media comprises a crossed field electrical configuration that emits pulses having rise times on the order of a few nanoseconds.